(12) United States Patent
Stassinos et al.

(10) Patent No.: US 9,066,576 B1
(45) Date of Patent: Jun. 30, 2015

(54) TRUCK HAMMOCK

(71) Applicants: Mattheu Theron Stassinos, Post Falls, ID (US); Joshua Kevin Lindley, Post Falls, ID (US)

(72) Inventors: Mattheu Theron Stassinos, Post Falls, ID (US); Joshua Kevin Lindley, Post Falls, ID (US)

( * ) Notice: Subject to any disclaimer, the term of this patent is extended or adjusted under 35 U.S.C. 154(b) by 0 days.

(21) Appl. No.: 14/205,155

(22) Filed: Mar. 11, 2014

(51) Int. Cl.
*A45F 3/24* (2006.01)
*B60N 3/00* (2006.01)

(52) U.S. Cl.
CPC .. *A45F 3/24* (2013.01); *B60N 3/008* (2013.01)

(58) Field of Classification Search
CPC .................. A45F 3/24; B60N 3/008

USPC ...................................... 5/120–122, 127–130
See application file for complete search history.

(56) References Cited

U.S. PATENT DOCUMENTS

| 2,524,499 | A | * | 10/1950 | Weir | .................................. | 5/127 |
| 8,123,190 | B2 | * | 2/2012 | Kost | ............................. | 248/514 |

* cited by examiner

*Primary Examiner* — Fredrick Conley
(74) *Attorney, Agent, or Firm* — Superior IP, PLLC; Dustin L. Call

(57) ABSTRACT

A system for securing a hammock in a vehicle bed. The system includes a hammock. The system also includes a bed support configured to attach to the vehicle bed and secure a first end of the hammock. The system further includes a hitch support configured to attach to a vehicle hitch receiver and secure a second end of the hammock.

20 Claims, 3 Drawing Sheets

TRUCK HAMMOCK

CROSS-REFERENCE TO RELATED APPLICATIONS

Not applicable.

BACKGROUND OF THE INVENTION

Many people appreciate owning pickup trucks, especially as they can be used for so many purposes other than just work. Truck owners often enjoy being outdoors and like using their trucks when they go camping or stargazing at night. Many simply sleep in the bed of the truck when possible as it is convenient and often allows for a minimum movement of gear, which is normally packed in the truck bed.

Nevertheless, sleeping in the bed is impractical in many instances. For example, the bed of the truck may have built in structures, such as a fifth wheel hitch or toolbox, which takes up too much space or is centrally located and thus does not leave enough space for a user to lie down. In addition, the bed of a truck is often hard to prevent damage done by moving cargo. This makes it an uncomfortable location to lie down.

Accordingly, there is a need in the art for a system which can be installed in a truck bed, but does not require space within the truck bed. Additionally, there is a need for the system to be easily installed.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a system for securing a hammock in a vehicle bed. The system includes a hammock. The system also includes a bed support configured to attach to the vehicle bed and secure a first end of the hammock. The system further includes a hitch support configured to attach to a vehicle hitch receiver and secure a second end of the hammock.

Another example embodiment includes system for securing a hammock in a vehicle bed. The system includes a hammock. The system also includes a bed support. The bed support is attached to the vehicle bed and a first end of the hammock is secured to the bed support. The system further includes a hitch support. The hitch support is attached to a vehicle hitch receiver, the height of the hitch support is adjustable and a second end of the hammock is secured to the hitch support.

Another example embodiment includes a system for securing a hammock in a vehicle bed. The system includes a hammock. The system also includes a bed support. The bed support includes a body configured to support the weight of the hammock and the user and elevate the hammock relative to the vehicle bed. The bed support also includes an attachment configured to secure the bed support to the vehicle bed and a hammock attachment, configured to secure the first end of the hammock. The system further includes a hitch support. The hitch support includes a body configured to support the weight of the hammock and the user and elevate the hammock relative to the vehicle bed. The hitch support also includes an attachment configured to secure the hitch support to the vehicle hitch receiver and a hammock attachment, configured to secure the second end of the hammock.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
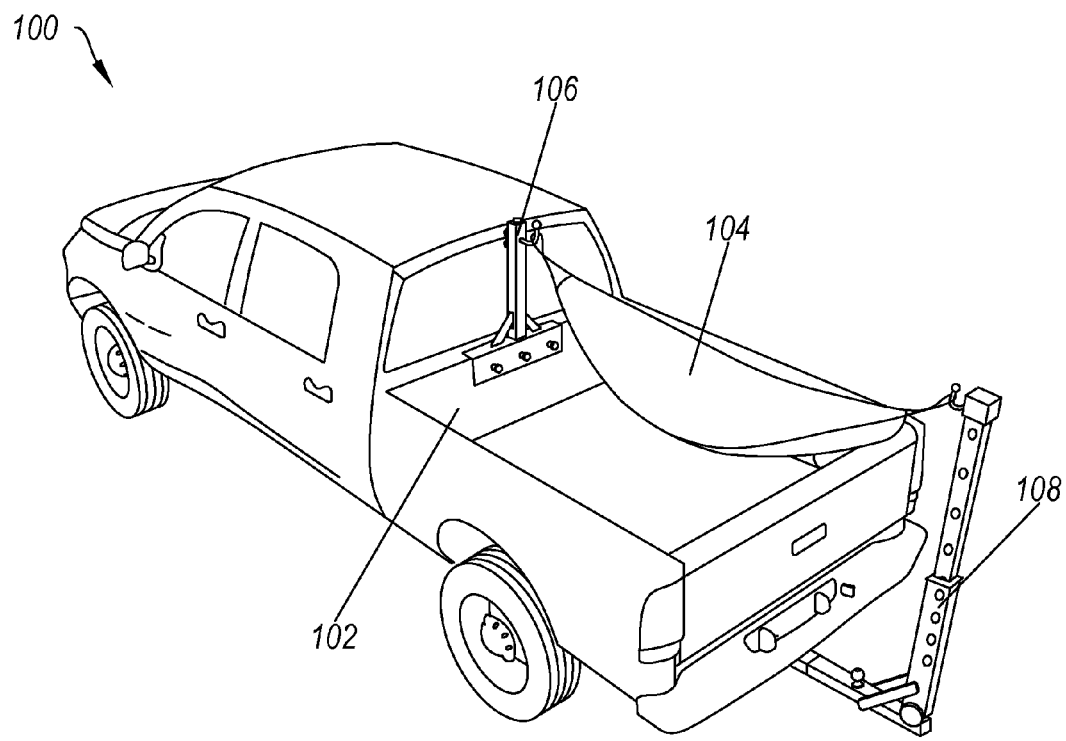
FIG. 1 illustrates an example of a truck hammock.

FIG. 1 illustrates an example of a truck hammock 100. The truck hammock 100 is configured to allow a hammock to be suspended over the bed of a truck. In particular, the truck hammock 100 provides the structural support necessary for a hammock to be installed in the bed of a pickup truck providing a place for a user to sleep or relax.

FIG. 1 shows that the truck hammock 100 can be installed in a vehicle bed 102. For example, the vehicle bed 102 can be in a pickup truck or other vehicle. A pickup truck, often simply referred to as a pickup or pick-up, is a light motor vehicle with an open-top, rear cargo area (bed). Although a vehicle bed is used herein as exemplary, one of skill in the art will appreciate, however, that the truck hammock 100 can be installed in any vehicle or in any other area of similar size and dimensions.

FIG. 1 also shows that the truck hammock 100 includes a hammock 104. A hammock 104 is a sling made of fabric, rope, or netting, suspended between two points, used for swinging, sleeping, or resting. The hammock 104 normally consists of one or more cloth panels, or a woven network of twine or thin rope stretched with ropes between two firm anchor points such as trees or posts. The hammock 100 supports a user while sitting or lying down and can be used for relaxing or as a lightweight bed. Additionally or alternatively, the hammock 100 can include a cover.

FIG. 1 further shows that the truck hammock 100 can include a bed support 106. The bed support 106 is configured to attach to the vehicle bed 102 to support the hammock 104 as described below. In particular, the bed support 106 attaches to a side of the vehicle bed and provides a support which will bear the weight of the hammock 104 and a user resting in the hammock 104. Additionally or alternatively, the bed support 106 can elevate the hammock 104 relative to the vehicle bed 102. As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

FIG. 1 additionally shows that the truck hammock 100 can include a hitch support 108. The hitch support 108 is configured to attach to a vehicle hitch receiver and support the end of the hammock 104 opposite the bed support 106 as described below. That is, the hitch support 108 can be inserted to a vehicle hitch and then provide a support which will bear the weight of the hammock 104 and a user resting in the hammock 104.

Figure 2:
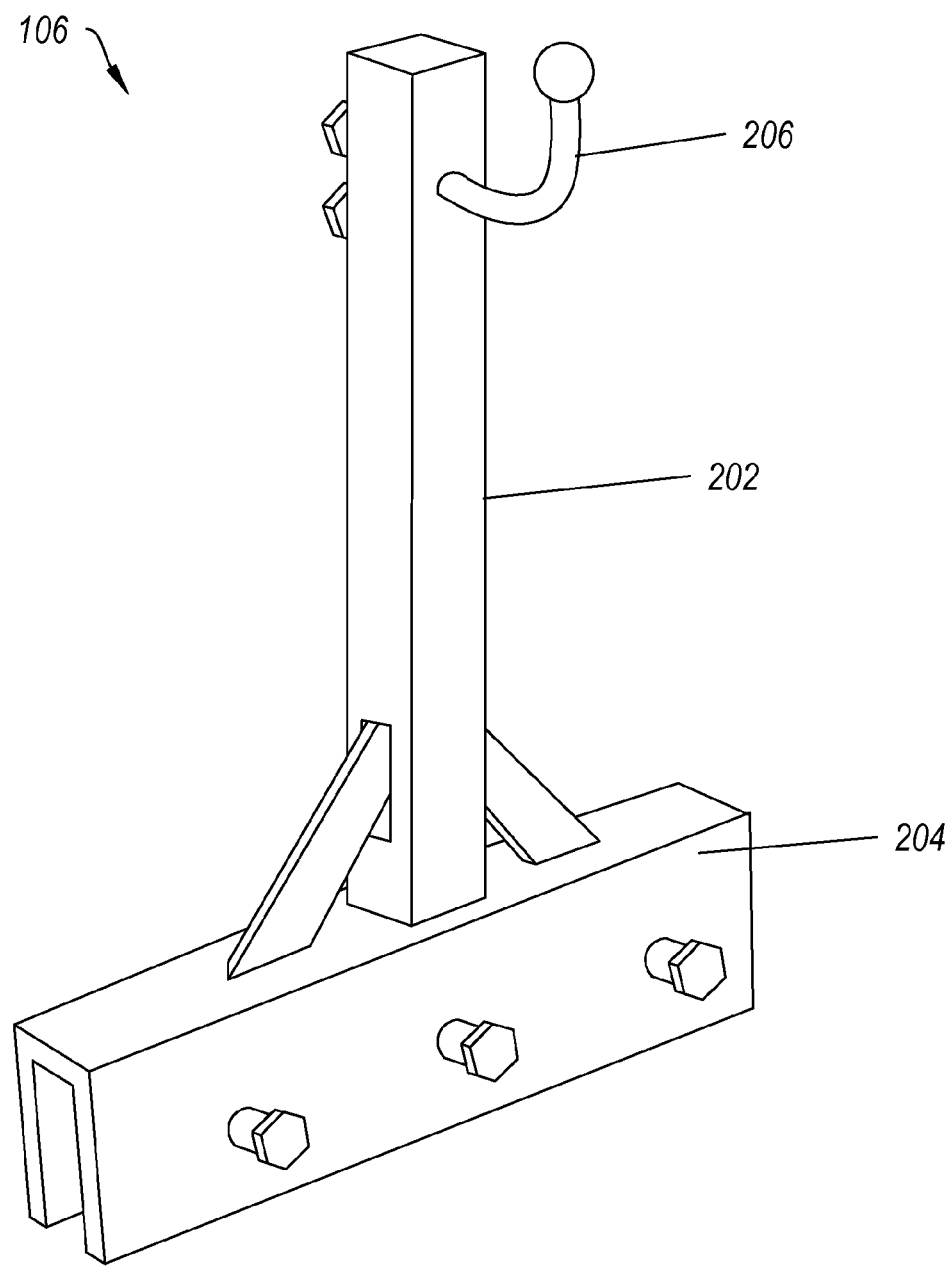
FIG. 2 illustrates an example of a bed support.

FIG. 2 illustrates an example of a bed support 106. The bed support 106 is configured to support one end of a hammock in a vehicle bed. In particular, the bed support 106 allows a user to suspend a hammock in a vehicle bed, allowing the user to relax or sleep in the hammock. The opposite end of the hammock can be supported by a hitch support (as described below), a second bed support 106, an external object, such as a tree or pole, or any other desired object.

FIG. 2 shows that the bed support 106 can include a body 202. The body 202 is configured to support the weight of the hammock and the user. For example, the body 202 can include steel or any other material of sufficient strength to support the hammock and user. Additionally or alternatively, the body 202 can be used to elevate the hammock. I.e., the body 202 can be configured to raise support the hammock above the top of the vehicle bed. Elevating the hammock can increase the space within the bed that can be used. I.e., the higher the hammock is mounted relative to the bottom of the vehicle bed, the more objects that can be stored in the vehicle bed under the hammock.

FIG. 2 also shows that the bed support 106 can include an attachment 204. The attachment 204 is configured to secure the body 202 of the bed support 106 to the vehicle bed. For example, the attachment 204 can include a U-shaped channel and one or more screw locks. The screw locks are threaded screws that can be turned, forcing the opposite side of the U-shaped channel against the bed such that friction prevents any movement of the attachment 204 relative to the vehicle bed.

FIG. 2 further shows that the bed support 106 can include a hammock attachment 206. The hammock attachment 206 is configured to secure a hammock to the bed support 106. In particular, the hammock attachment 206 allows a user to attach the hammock to the bed support 106 when desired. For example, the hammock attachment 206 can include a hook, a carabiner, a loop or any other desired attachment mechanism. A carabiner (or karabiner) is a metal loop with a spring loaded gate used to quickly and reversibly connect components.

Figure 3:
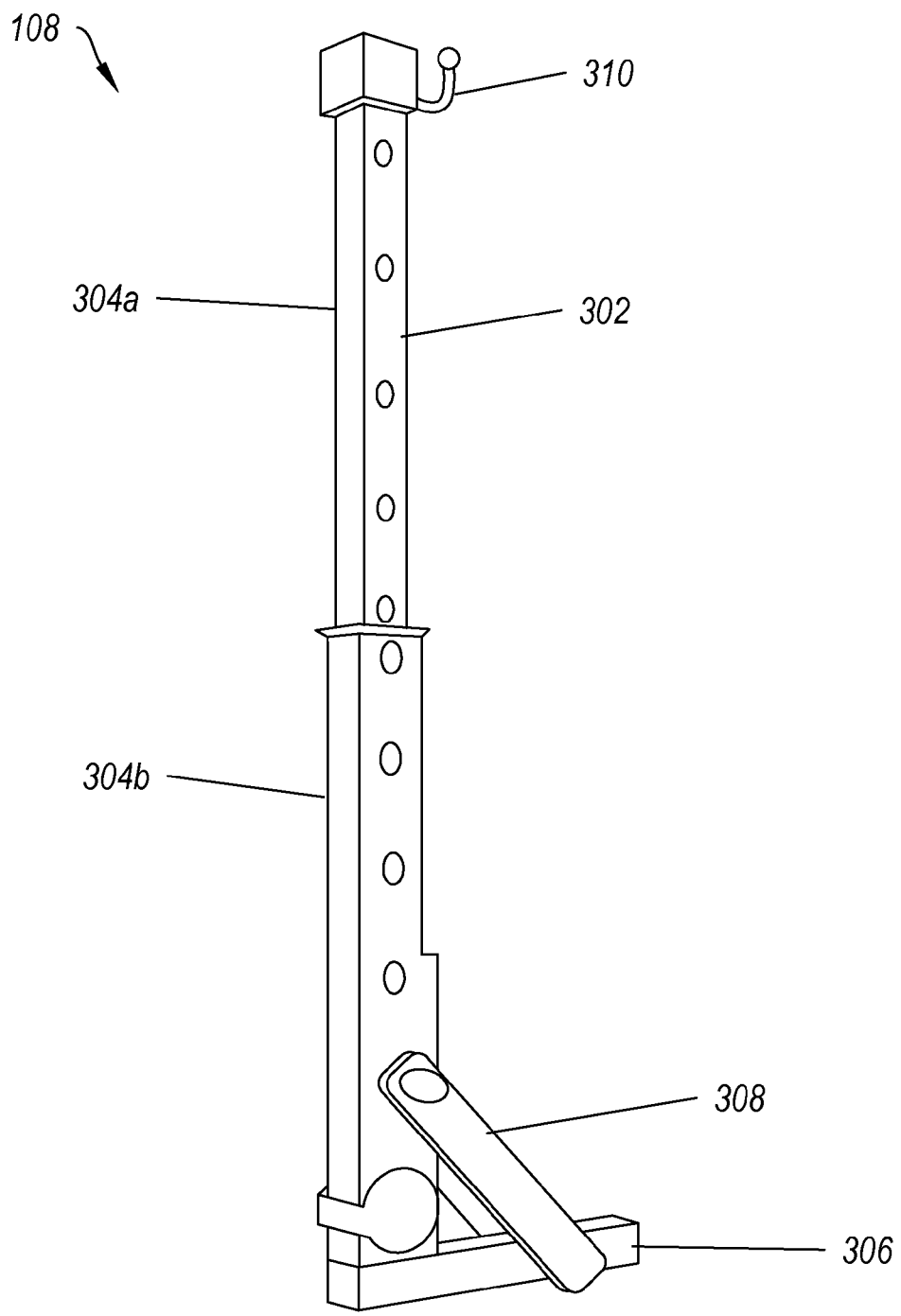
FIG. 3 illustrates an example of a hitch support.

FIG. 3 illustrates an example of a hitch support 108. The hitch support 108 is configured to mate with a vehicle hitch and support one end of a hammock in a vehicle bed. In particular, the hitch support 108 allows a user to suspend a hammock in a vehicle bed, allowing the user to relax or sleep in the hammock. The opposite end of the hammock can be supported by a bed support (as described above), an external object, such as a tree or pole, or any other desired object.

FIG. 3 shows that the hitch support 108 can include a body 302. The body 302 is configured to support the weight of the hammock and the user. For example, the body 302 can include steel or any other material of sufficient strength to support the hammock and user. Additionally or alternatively, the body 302 can be used to elevate the hammock. I.e., the body 302 can be configured to support the hammock above the top of the vehicle be. Elevating the hammock can increase the space within the bed that can be used. I.e., the higher the hammock is mounted relative to the bottom of the vehicle bed, the more objects that can be stored in the vehicle bed under the hammock.

FIG. 3 also shows that the body 302 can include a first portion 304a and a second portion 304b. The first portion 304a and the second portion 304b allow the height of the body to be adjusted. In particular, the first portion 304a can be inserted into, and move relative to, the second portion 304b. The first portion 304a and the second portion 304b can be secured to one another using a pin, bolt or other securing mechanism. I.e., the first portion 304a and the second portion 304b can each include a series of holes. When the desired height is achieved, the holes can be aligned and a pin can be inserted maintaining the alignment.

FIG. 3 further shows that the hitch support 108 can include a hitch attachment 306. The hitch attachment 306 can be configured to attach the hitch support 108 to a vehicle hitch receiver. For example, the hitch attachment can be approximately 1.25 inches wide and 1.25 inches high or can be approximately 2 inches wide and 2 inches high, depending on the size of the hitch receiver. The size can be critical to ensure that the hitch attachment 306 fits within the hitch receiver and effectively transfers all supported weight to the hitch receiver. Additionally or alternatively, the hitch attachment 306 can include a hole to receive a pin which passes through the hitch receiver. As used in the specification and the claims, the term approximately shall mean that the value is within 10% of the stated value, unless otherwise specified.

FIG. 3 additionally shows that the hitch support 108 can include a brace 308. The brace 308 is configured to secure the body 302 to the hitch attachment 306. I.e., because of the length of the body 302 a high amount of torque is placed on the attachment between the body 302 and the hitch attachment 306. The brace 308 is configured to resist the torque and prevent failure of the attachment between the body 302 and the hitch attachment 306. Additionally or alternatively, the body 302 can rotate relative to the hitch attachment 306 for storage and the brace 308 can secure the hitch support 108 in the correct alignment during use.

FIG. 3 further shows that the bed support 108 can include a hammock attachment 310. The hammock attachment 310 is configured to secure a hammock to the hitch support 108. In particular, the hammock attachment 310 allows a user to attach the hammock to the hitch support 108 when desired. For example, the hammock attachment 310 can include a hook, a carabiner, a loop or any other desired attachment mechanism.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for securing a hammock in a vehicle bed, the system comprising:
   a hammock;
   a bed support configured to:
      attach to the vehicle bed; and
      secure a first end of the hammock; and
   a hitch support configured to:
      attach to a vehicle hitch receiver; and
      secure a second end of the hammock.

2. The system of claim 1, wherein the hammock includes: a cover.

3. The system of claim 1, wherein the hammock includes: netting.

4. The system of claim 1, wherein the hammock includes: fabric.

5. The system of claim 1, wherein the hammock includes: a ring on the first end.

6. The system of claim 1, wherein the hammock includes: a hook on the first end.

7. A system for securing a hammock in a vehicle bed, the system comprising:
   a hammock;
   a bed support, wherein:
      the bed support is attached to the vehicle bed; and
      a first end of the hammock is secured to the bed support; and
   a hitch support, wherein:
      the hitch support is attached to a vehicle hitch receiver;
      the height of the hitch support is adjustable; and
      a second end of the hammock is secured to the hitch support.

8. The system of claim 7, wherein the bed support includes:
   a body configured to:
      support the weight of the hammock and the user; and
      elevate the hammock relative to the vehicle bed.

9. The system of claim 7, wherein the bed support includes:
   an attachment configured to secure the bed support to the vehicle bed.

10. The system of claim 9, wherein the attachment includes a U shaped channel.

11. The system of claim 9, wherein the attachment includes one or more screws.

12. The system of claim 7, wherein the bed support includes:
   a hammock attachment, configured to secure the first end of the hammock.

13. The system of claim 12, wherein the hammock attachment includes a hook.

14. The system of claim 7, wherein the hitch support includes:
   a body configured to:
      support the weight of the hammock and the user; and
      elevate the hammock relative to the vehicle bed.

15. The system of claim 7, wherein the hitch support includes:
   a first portion; and
   a second portion;
   wherein the first portion is configured to:
      be inserted into the second portion; and
      move relative to the second portion.

16. The system of claim 15, wherein:
   the first portion and the second portion each include a series of holes.

17. The system of claim 16, wherein the hitch support includes:
   a hitch attachment configured to attach the hitch support to a vehicle hitch receiver.

18. A system for securing a hammock in a vehicle bed, the system comprising:
   a hammock;
   a bed support, wherein the bed support:
      includes a body configured to:
         support the weight of the hammock and the user; and
         elevate the hammock relative to the vehicle bed;
      an attachment configured to secure the bed support to the vehicle bed; and
      a hammock attachment, configured to secure the first end of the hammock; and
   a hitch support, wherein the hitch support:
      includes a body configured to:
         support the weight of the hammock and the user; and
         elevate the hammock relative to the vehicle bed;
      an attachment configured to secure the hitch support to the vehicle hitch receiver; and
      a hammock attachment, configured to secure the second end of the hammock.

19. The system of claim 18, wherein the hitch attachment includes a cross section measuring approximately 1.25 inches wide and 1.25 inches high.

20. The system of claim 18, wherein the hitch attachment includes a cross section measuring approximately 2 inches wide and 2 inches high.

* * * * *